Figure 1:
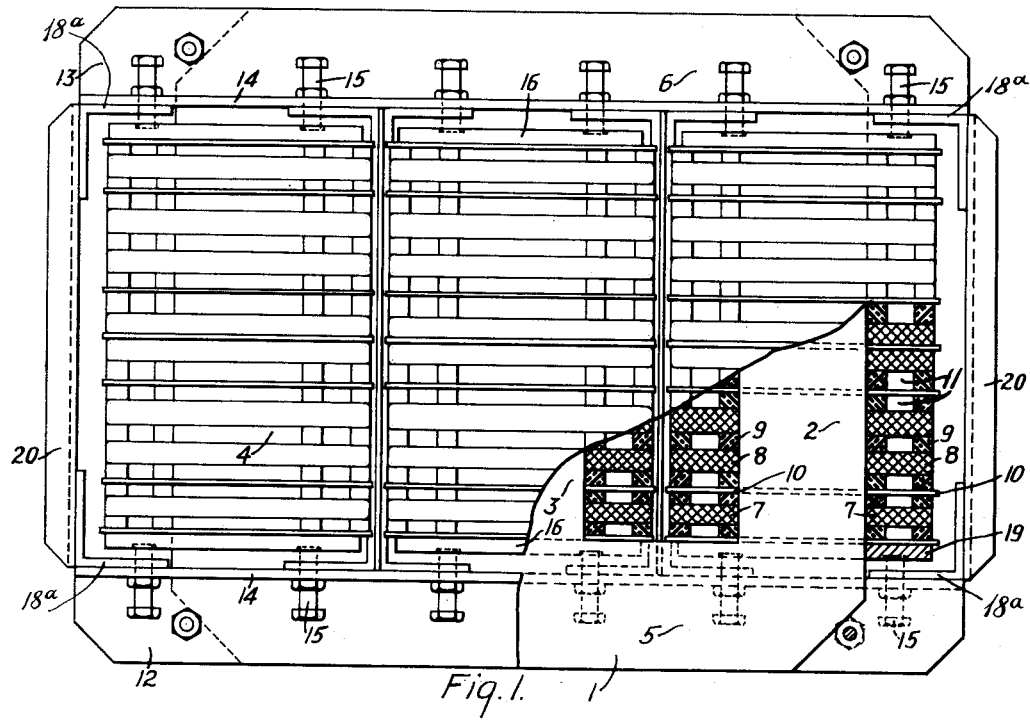

J. F. PETERS.
TRANSFORMER.
APPLICATION FILED APR. 18, 1917.

1,351,061.

Patented Aug. 31, 1920.

WITNESSES:
Fred. A. Lind.
Geo. W. Hansen.

INVENTOR
John F. Peters
BY
Wesley G. Carr
ATTORNEY

UNITED STATES PATENT OFFICE.

JOHN F. PETERS, OF PITTSBURGH, PENNSYLVANIA, ASSIGNOR TO WESTINGHOUSE ELECTRIC & MANUFACTURING COMPANY, A CORPORATION OF PENNSYLVANIA.

TRANSFORMER.

1,351,061.  Specification of Letters Patent.  Patented Aug. 31, 1920.

Application filed April 18, 1917. Serial No. 163,006.

*To all whom it may concern:*

Be it known that I, JOHN F. PETERS, a citizen of the United States, and a resident of Pittsburgh, in the county of Allegheny and State of Pennsylvania, have invented a new and useful Improvement in Transformers, of which the following is a specification.

My invention relates to transformers and it has special relation to power transformers of large capacity in which it is necessary to provide adequate means for mechanically bracing the current-carrying coils against, and insuring them protection from, the abnormal forces that are imposed upon the coils when the transformers are subjected to short circuits, heavy overloads and other abnormal conditions. At the same time, adequate ventilating means must be provided for the circulation of the cooling and insulating fluid without weakening the mechanical structure of the transformers.

It is frequently desirable to connect both the primary and secondary phase windings of a polyphase power transformer in star relation. In this instance, a polyphase core-type transformer will be required if substantially pure sine voltage-waves are demanded. In a polyphase core-type transformer, the third and other resulting and distorting harmonics are eliminated because the auxiliary magnetic paths formed by the outer core legs of a shell-type transformer are absent, which condition permits the generation of substantially pure sine voltage-waves.

In a shell-type polyphase transformer, the outer core legs are responsible for the generation of third harmonics in the fundamental voltage waves. In consequence thereof, it is usual to connect at least one group of the windings in delta relation whereby a circulating current, tending to suppress these distorting third harmonics, is permitted to flow. Of course, when the phase windings are connected in star relation, as I contemplate in the transformer of the present invention, this circulating current in the phase windings is eliminated. Therefore, it is necessary to resort to the core-type construction in order to insure the production of substantially pure sine voltage-waves.

In commercial shell-type power transformers, rectangular current-carrying pancake-type coils are almost exclusively employed. Because of the adaptability of such coils, bracing means may be readily applied which will insure adequate protection to the coils against any mechanical stresses that may develop in the transformer during short circuits and the like. Moreover, shell-type transformers, as now developed, are economical to construct and convenient to handle because of the readiness with which the rectangular pancake-type coils lend themselves to adequate bracing methods. Again, in shell-type transformers ventilating passageways are disposed between the pancake coils whereby the cooling and insulating fluid may be brought into intimate contact with the active materials embodied in the transformer. The ventilating passageways in shell-type transformers are unobstructed and the cooling fluid is thereby permitted to flow freely in its natural course of circulation. The aforementioned properties possessed by shell-type transformers make them highly desirable from the operating and manufacturing point of view.

On the other hand, core-type power transformers heretofore constructed have been unsatisfactory because of the difficulty involved in bracing the coils to protect them against displacement and distortion when subjected to severe mechanical stresses, such as are developed under short-circuit conditions. The pancake-type coils previously employed in core-type transformers were circular in form. This was required by reason of the character of the core structure and the method of assembling these coils upon the core legs. Much difficulty was experienced in bracing these circular coils against even ordinary mechanical forces. Frequently, the coils were displaced when the transformer was handled for the purpose of transportation. Another defect of core-type transformers of the usual form was the inadequate means for ventilating the coils. The coils were horizontally positioned and superposed upon one another, which construction precluded the positioning of ventilating ducts between them through which the cooling and insulating fluid could freely circulate in a natural manner. In order to provide adequate ventilating means for the coils embodied in core-type transformers, it was necessary to employ intricately sectional wound coils but, even under these conditions, the ventilating ducts were not wholly unobstructed.

In the transformer of the present invention, the desirable mechanical and ventilating features of a polyphase shell-type transformer are incorporated into a transformer which possesses the electrical characteristics of a polyphase core-type transformer.

One object of my invention, therefore, is to provide a polyphase power transformer that permits its phase windings to be connected in star relation and, at the same time, eliminates distorting harmonics because the generated voltage waves have substantially pure sine forms. Again, the coils of the transformer are adequately braced to resist distortion and displacement when subjected to severe mechanical forces, such as develop under short-circuit conditions. Moreover, I am enabled, in the present transformer, to provide adequate ventilating ducts between the coils and the active material embodied in the transformer which ventilating ducts are unobstructed and interposed in the path of the natural flow of the insulating and cooling fluid.

Figure 2:
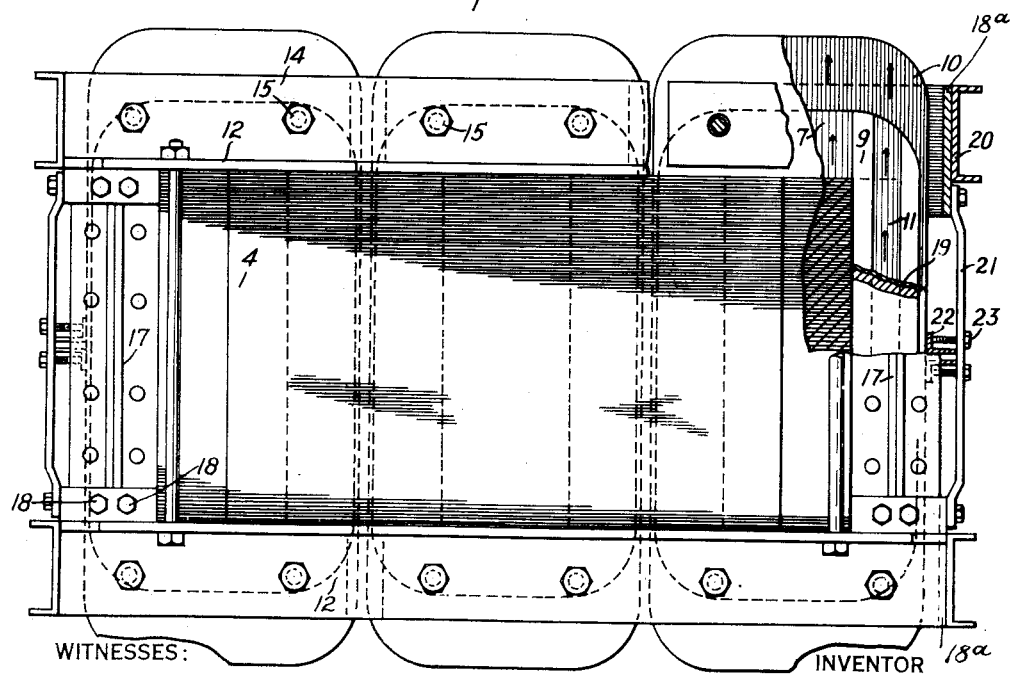

For a better understanding of the nature and scope of my invention, reference may be had to the following description and the accompanying drawing in which Figure 1 is a top view, partially in section, of a transformer embodying a form of my invention, and Fig. 2 is a view, partially in elevation and partially in section, of the transformer illustrated in Fig. 1.

Referring to the drawing, the core member 1, which is built up in the usual fashion from laminated material, comprises three core legs 2, 3 and 4 that are mutually connected by means of yoke portions 5 and 6. The core member, in general, possesses the usual form heretofore employed in core-type transformers, with the exception that, in the assembly structure of the present transformer, the core legs are placed horizontally.

The current-carrying coils upon the two outer core legs 2 and 4 are similarly assembled, so I will describe, in detail, the manner of assembling the coils upon the core leg 2. Low-tension coils 7 and high-tension coils 8 are wound in the form of rectangular pancake-type coils, such as are embodied in shell-type transformers and shown in Fig. 2. These coils are set vertically and spaced from one another by means of insulating strips 9 and insulating barriers 10. The insulating strips 9 have a small cross sectional area and are spaced from one another in order to provide vertical ventilating passageways or ducts 11 between adjacent coils. The ventilating passageways 11 extend lengthwise of the coils and provide vertical passageways whereby the insulating and cooling liquid in which the transformer is immersed may unobstructedly flow upwardly. The low-tension coils 7 and the high-tension coils 8 are sandwiched in the usual manner in order to decrease the internal reactance of the transformer.

Since the inner sides of the coils embracing the two outer core legs 2 and 4 are opposed by the yoke portions of the core structure and rigidly supported by means of the spacing strips 9 and the insulating barriers 10, no auxiliary means is necessary for mechanically bracing these portions of the coils. The coils embracing the central core leg 3 are likewise mechanically braced by means of yoke portions of the core member. It remains, however, to provide means for mechanically bracing the exposed upper and lower edges of the coils as well as the exposed sides of the coils embracing the core legs 2 and 4.

Angle-iron members 12 and 13 are secured to both sides of the upper and lower portions of the core member 1. Flanges 14 on the members 12 and 13 are provided with a series of spaced tightening bolts 15 which force insulating barriers 16 in close mechanical contact with the side faces of the outer coils of the coil groups. By tightening the bolts 15, the coils of each group are maintained in rigid relationship with respect to one another and mechanically braced against all forces tending to displace them.

The exposed sides of the coil groups embracing the core legs 2 and 4 are subtended by a built-up structure 17 each side of which comprises two vertically positioned angle irons that have their corresponding flanges abutting each other. The bracing structure 17 is secured, by means of bolts 18, to 90° corner irons 18[a], which are, in turn, bolted to the top and bottom end frames comprising the angle-iron members 12 and 13. The bolts 18 may be tightened in order to force insulating strips 19 against the exposed sides of the coils. In this manner, the coils are braced and rigidly held in position whereby they may resist all mechanical forces to which they may be subjected.

In order to preclude the coils on the outer core legs 2 and 4 from being laterally displaced, channel-iron members 20 are bolted to the corner angles 18[a]. Bars 21 subtend the outer edges of the exposed coil sides and are bolted to the top and bottom corner angles 18[a]. Braces 22 formed of angle-iron members span the edges of the built-up coil groups. The braces 22 are secured to the rods 21 by means of tightening bolts 23 whereby the braces 22 may be brought into intimate contact with the coils. By bracing the outer coil edges at substantially their mid-points, in the manner described, adequate means are provided for preventing the coils from becoming laterally displaced.

It will be noted from the foregoing description that the core member embodies the magnetic characteristics inherent in core-type structures. As heretofore mentioned, a core member of this form precludes the introduction of third harmonics into the fundamental voltage waves. At the same time, the coils possess the general form of those heretofore employed in shell-type transformers and, in consequence thereof, they are readily braced to resist all mechanical forces that may be imposed upon them. By positioning the coils vertically and disposing the core structure as shown, the ventilating passageways between the coils are perpendicularly placed in the direct path of the cooling and insulating fluid. The bracing means for the coils are so arranged that the ventilating ducts offer an unobstructed passage for the flow of the cooling liquid whereby the transformer may be adequately ventilated without resorting to forced ventilating methods.

While I have shown and described one embodiment of my invention, it will be understood that other modifications may be made therein without departing from the spirit and scope of the appended claims.

I claim as my invention:

1. In a polyphase transformer, the combination of a magnetizable core member and groups of rectangular pancake-type coils, said core member comprising three legs, each of which is embraced by one of said coil groups, and core-leg-bridging members, said core legs being traversed by equal flux at all times, and said core member further being so constructed and so embraced by said coil group, that only the coil sides of the middle coil group are totally embraced.

2. In a polyphase transformer, the combination of a magnetizable core member and groups of rectangular pancake-type coils, said core member comprising three legs, each of which is embraced by one of said coil groups, and core-leg-bridging members, said core legs and said bridging members all being equal to each other in width, and said core member further being so constructed and so embraced by said coil group, that only the coil sides of the middle coil group are totally inclosed.

3. In a polyphase transformer, a three-legged core member, groups of rectangular coils, each of the core legs being embraced by a coil group but only the middle coil group having all its sides embraced by the core, and bracing means surrounding, and forming a box-like inclosure for, the coil edges and faces of those coil groups which are not embraced by the core.

4. In a polyphase transformer, a three-legged core member, groups of rectangular coils, each of the core legs being embraced by a coil group but only the middle coil group having all its sides embraced by the core, whereby the unembraced side edges and faces of the coils of the other groups are exposed, and bracing means for said exposed coil portions comprising retaining members extending along the exposed faces of said coils and further retaining means exerting pressure at substantially the mid-point of the exposed coil edges.

5. In a polyphase transformer, a three-legged core member, groups of rectangular coils, each of the core legs being embraced by a coil group but only the middle coil group having all its sides embraced by the core, whereby the unembraced side edges and faces of the coils of the other groups are exposed, an upper and lower framing for said core member, and bracing means for said exposed coil portions comprising retaining members extending along the exposed faces of said coils and bars secured to said framing and carrying a member exerting pressure at substantially the mid-point of the exposed coil edges.

6. In a polyphase transformer, a three-legged core member, groups of rectangular coils, each of the core legs being embraced by a coil group but only the middle coil group having all its sides embraced by the core, whereby the unembraced side edges and faces of the coils of the other groups are exposed, upper and lower framing comprising side and end angle irons secured to corner angles, and bracing means for said exposed coil portions comprising retaining members secured to said corner angles and urged against the exposed coil faces, and bars likewise secured to said angle corners and adapted to urge a pressure member against substantially the mid-point of said exposed coil edges.

In testimony whereof I have hereunto subscribed my name this 29th day of March, 1917.

JOHN F. PETERS.